United States Patent
Grauer et al.

(10) Patent No.: US 7,850,096 B2
(45) Date of Patent: Dec. 14, 2010

(54) INJECTION HEAD FOR THE COMBUSTION CHAMBER OF A ROCKET PROPULSION UNIT

(75) Inventors: Frank Grauer, Bad Toelz (DE); Gerald Hagemann, Poing (DE)

(73) Assignee: Astrium GmbH, Munich (DE)

( * ) Notice: Subject to any disclaimer, the term of this patent is extended or adjusted under 35 U.S.C. 154(b) by 320 days.

(21) Appl. No.: 12/034,991

(22) Filed: Feb. 21, 2008

(65) Prior Publication Data

US 2008/0210786 A1  Sep. 4, 2008

(30) Foreign Application Priority Data

Feb. 21, 2007 (DE) .................. 10 2007 008 942

(51) Int. Cl.
*B05B 7/06* (2006.01)
(52) U.S. Cl. .............. 239/424; 239/104; 239/288; 239/423; 239/548; 239/549; 239/556; 60/257; 60/258
(58) Field of Classification Search ........... 239/104, 239/288–288.5, 423, 424, 461, 462, 504, 239/548, 549, 556, 558, 590, 590.5; 60/257, 60/258
See application file for complete search history.

(56) References Cited

U.S. PATENT DOCUMENTS

| | | | | |
|---|---|---|---|---|
| 2,928,236 A | * | 3/1960 | Kircher et al. ............ | 60/258 |
| 3,115,009 A | * | 12/1963 | Lattanzio et al. ........... | 239/424 |
| 3,221,499 A | * | 12/1965 | Hasbrouck ................. | 60/258 |
| 3,335,956 A | * | 8/1967 | James ....................... | 239/424 |
| 3,508,712 A | | 4/1970 | MacMunn | |
| 3,603,092 A | | 9/1971 | Paine | |
| 3,780,952 A | | 12/1973 | Huang | |
| 4,801,092 A | | 1/1989 | Webber et al. | |
| 5,603,213 A | * | 2/1997 | Sion et al. ................. | 60/258 |
| 6,536,208 B1 | * | 3/2003 | Kretschmer ............... | 60/258 |

FOREIGN PATENT DOCUMENTS

| | | |
|---|---|---|
| DE | 1 152 851 | 8/1963 |
| DE | 1 576 597 | 6/1970 |
| DE | 2 108 188 | 8/1972 |
| DE | 42 03 775 A1 | 8/1993 |
| DE | 10 2004 029 029 A1 | 1/2006 |

* cited by examiner

*Primary Examiner*—Steven J Ganey
(74) *Attorney, Agent, or Firm*—Crowell & Moring LLP

(57) ABSTRACT

An injection head for the combustion chamber of a rock propulsion unit has a base area with a plurality of injection elements distributed on it. Propellant constituents can be injected from each outlet of the injection elements into the combustion chamber, generating hot gases by a mixing and combustion of the propellant constituents in the combustion chamber, which hot gas can be accelerated to a high velocity for generating thrust. The base area of the injection head had a contoured shape which prevents or reduces the formation of zones of a reduced pressure, particularly between directly adjacent outlets.

10 Claims, 2 Drawing Sheets

INJECTION HEAD FOR THE COMBUSTION CHAMBER OF A ROCKET PROPULSION UNIT

BACKGROUND AND SUMMARY OF THE INVENTION

This application claims the priority of German Application No. 10 2007 008 942.4 filed Feb. 21, 2007, the disclosure of which is expressly incorporated by reference herein.

The invention relates to an injection head for the combustion chamber of a rocket propulsion unit. In particular, the invention relates to such a combustion chamber having a number of injection elements that are distributed over a base area such that propellant constituents can be injected from one outlet of the injection elements respectively into the combustion chamber. As a result, hot gas can be generated by mixing and combustion of the propellant constituents in the combustion chamber, which hot gas can be accelerated to a high velocity for generating thrust.

The propellant constituents are fed into the combustion chamber of a rocket propulsion unit by injection elements. In a liquid-fuelled rocket engine, an oxidizer and the actual fuel are required as the propellant constituents. As a result of the injection of the propellant constituents into the combustion chamber, the latter are mixed with one another and burnt, generating a hot gas at a high temperature and pressure. As a result of the expansion of the hot gas to a high velocity within the combustion chamber, the thermal energy of the hot gas is converted to kinetic energy, and thrust is generated.

The efficiency of the rocket propulsion unit depends decisively on the quality of the propellant conversion. The latter, in turn, is a function of the type of injection; for example, the number and arrangement of the injection elements in the injection head. For cryogenic propellants, such as hydrogen and oxygen, so-called coaxial injection elements are used virtually without exception. When the latter are used, the oxygen is injected into the combustion chamber by way of a central tube and an annulus arranged around the central tube. In this case, it is known to inject one of the propellant constituents with a swirl in order to improve its mixing and thereby the combustion. The use of coaxial injection elements is also known in the case of storable propellants, such as LOX/HC or MMH/NTO.

One object of the present invention is to provide an injection head for the combustion chamber of a rocket propulsion unit which has an efficiency when that is higher than that of conventional injection heads, when converting propellants.

This and other objects and advantages are achieved by the injection apparatus according to the according to the invention, which is based on the recognition that, for ideal conversion of the propellants in the combustion chamber, an infinite number of elements would be required to provide optimal distribution and mixing of propellant constituents in the combustion chamber. However, since this is not possible for practical reasons, the infinite number of injection elements, which are distributed over the base area of the injection head, forces a discrete injection. In this case, it was found that, when the propellants are injected into the combustion chamber, the propellant or the oxidizer encounters a sudden cross-sectional widening at the outlet of the injection element. This creates clearances in the combustion chamber close to the base area between the injection elements, in which clearances recirculation zones with losses are formed during the hot gas operation. The recirculation zones result in a loss of pressure, similar to "Carnot's shock loss". Here, the pressure loss has a directly proportional effect on the loss of thrust. The base area over which the number of injection elements are arranged is also called head plate or face plate.

For avoiding this loss of pressure, in the injection head according to the invention the base area of the injection head has a contoured design, which prevents (or at least reduces) the formation of zones of reduced pressure, particularly between directly adjacent outlets. By means of the contoured base area of the injection head in the combustion chamber, the recirculation zones can be avoided, so that the above-described pressure losses are prevented or at least reduced. As a result, a higher efficiency can be achieved.

The contoured shape of the base area of the injection head is formed by a number of elevations which extend between the injection elements into the combustion chamber in such a manner that clearances between the outlets are avoided. The contouring generally depends on the geometry of the injection head, that is, on the type, size and number of injection elements as well as their distribution over the base area.

It was found to be expedient to arrange at least one elevation between two outlets respectively. In a further feature of the invention, precisely one elevation is arranged between two outlets respectively, which may be further developed to be bulged or curved, so that a cross-sectional widening for the propellant constituents exiting from the outlets of the injection elements is limited or takes place in a defined manner.

In other words, the head plate of the injection head according to the invention is constructed such that the injection elements are arranged in funnel-shaped indentations.

It is also expedient for a foot of the elevation of the contoured design to adjoin at least one of the outlets in order to provide a defined widening of the cross-section in the area of the outlets of the injection elements, and to bound a cross-sections widening so as to avoid zones with pressure losses in the combustion chamber.

According to a further aspect of the invention, an elevation is arranged between an outlet and a wall bounding the combustion chamber, so that (as described above) the formation of a recirculation zone between the combustion chamber wall and the outlet of an adjacent injection element (which would also result in a reduction of the efficiency) is also avoided.

The contoured base area can be formed in the head plate according to a further feature. This means that the contour is integrated in the head plate. Alternatively, the contouring can be deposited as an additional body onto an essentially plane head plate in which the injection elements are arranged. In this case, the contoured base area is provided by a body equipped with the desired contour, which body is then arranged on the head plate of the injection head. The contoured body may comprise metallic and/or non-metallic material, depending essentially on the thermal stress.

By providing a contoured head plate of an injection head for the combustion chamber of a rocket propulsion unit, the quality of the propellant conversion can be improved. By means of the 3-dimensional surface of the base area of the injection head, the stability behavior during the operation of the rocket propulsion unit is also improved.

Other objects, advantages and novel features of the present invention will become apparent from the following detailed description of the invention when considered in conjunction with the accompanying drawings.

DETAILED DESCRIPTION OF THE DRAWINGS

Figure 2:
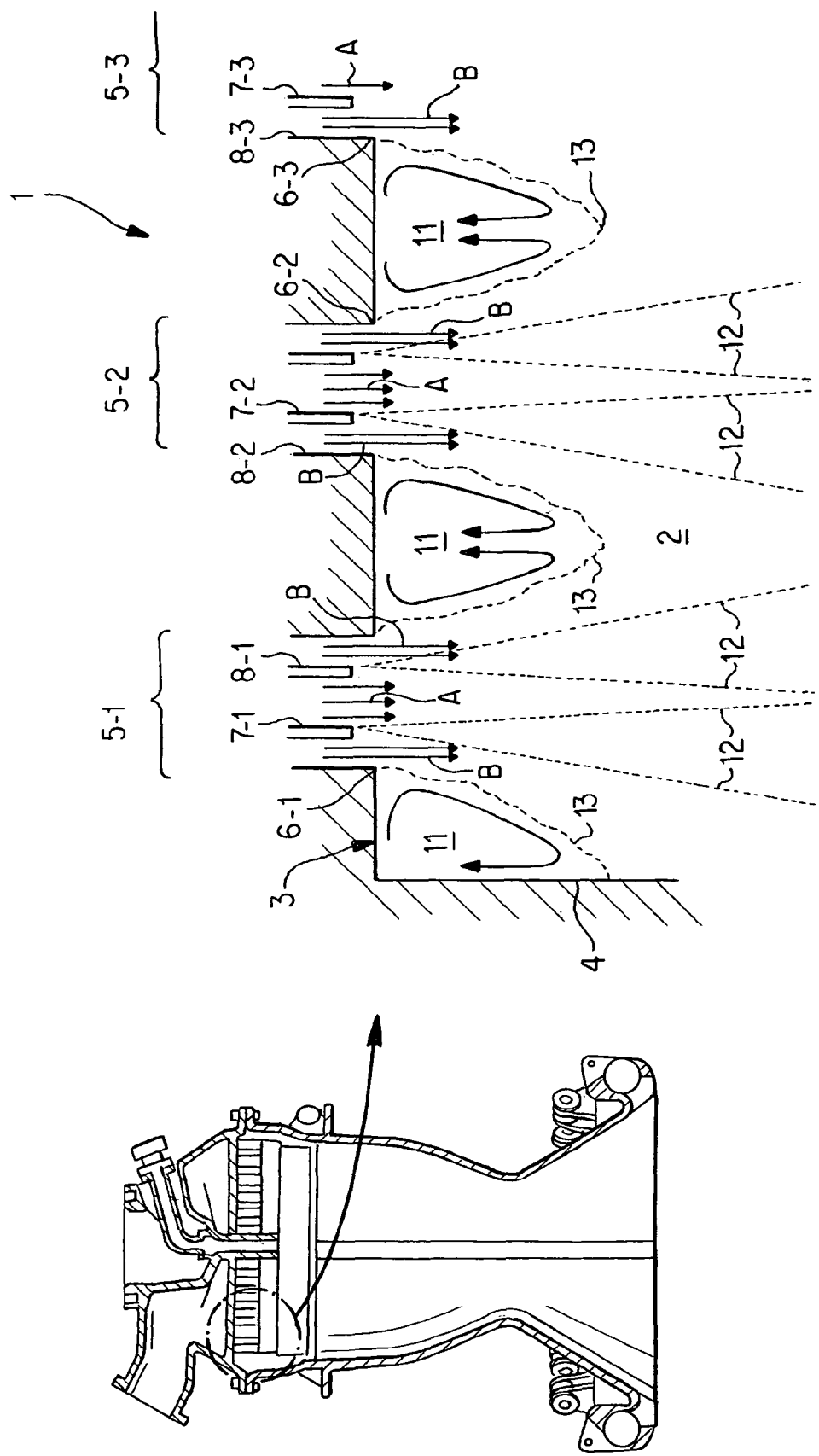
FIG. 2 is a schematic cross-sectional view of a portion of an injection head, as it is known from the state of the art.

FIG. 2 is a schematic cross-sectional representation of a section of an injection head 1 for the combustion chamber of a known rocket propulsion unit. The basic construction of a rocket propulsion unit is illustrated in the left half of the figure and is familiar to a person skilled in the art, so that it does not have to be discussed here in detail. The areas of the rocket propulsion unit relevant to the invention are enlarged. The injection head 1 comprises a combustion chamber 2 which is bounded by a head plate 3 and combustion chamber walls 4 adjoining the head plate 3 (of which only one wall is shown). The combustion chamber walls 4 taper opposite the head plate 3, so that the combustion chamber 2 leads into an expansion nozzle.

In the embodiment of FIG. 2, three coaxial injection elements 5-1, 5-2, 5-3 are arranged at the head plate 3. Each of the coaxial injection elements 5-1, 5-2, 5-3 comprises a central tube 7-1, 7-2, 7-3 which is surrounded by an annulus 8-1, 8-2, 8-3. In a manner known to a person skilled in the art, a first propellant constituent is injected through the central tube 7-1, 7-2, 7-3 into the combustion chamber, which is marked by reference symbol A, while a second propellant constituent is injected by way of the annulus 8-1, 8-2, 8-3 into the combustion chamber, which is marked by reference symbol B in FIG. 2. (In a further development of the central tube 7-1, 7-2, 7-3 and/or of the annulus 8-1, 8-2, 8-3, one of the propellant constituents may be provided with a swirl in order to achieve a better mixing of the propellant constituents in the combustion chamber 2.) By way of a respective outlet 6-1, 6-2, 6-3, the injection elements 5-1, 5-2, 5-3 at the head plate 3 lead into the combustion chamber 2. Within the scope of the present description, the outlet is the outside diameter of the coaxial injection element. For example, hydrogen and oxygen as the oxidizer can be used as propellant constituents. Also possible is the use of LOX (liquid oxygen) and HC or MMH (monomethyl hydrazine) and NTO (nitrogen tetroxide) as propellant constituents.

When injecting the first and second propellant constituent, a cross-sectional widening occurs after the exit from the outlets 6-1, 6-2, 6-3. In this case, a good mixing of the propellant constituents take place in the combustion zones marked by the reference number 12, which combustion zones widen approximately in a funnel shape from the outlets 6-1, 6-2, 6-3. Simultaneously, so-called hot-gas or recirculation zones 11 are formed between two adjacent outlets 6-1, 6-2, 6-3 of respective injection elements 5-1, 5-2, 5-3 as well as between the combustion chamber wall 4 and the adjacent outlet 6-1 of the injection element 5-1. A pressure loss occurs in these hot-gas or recirculation zones 11, which causes a directly proportional loss of thrust. The boundary between the recirculation zones 11 and the combustion zones 12, which is marked by the boundary areas 13, has the form of bulged elevations between adjacent outlets 6-1, 6-2, 6-3.

Figure 1:
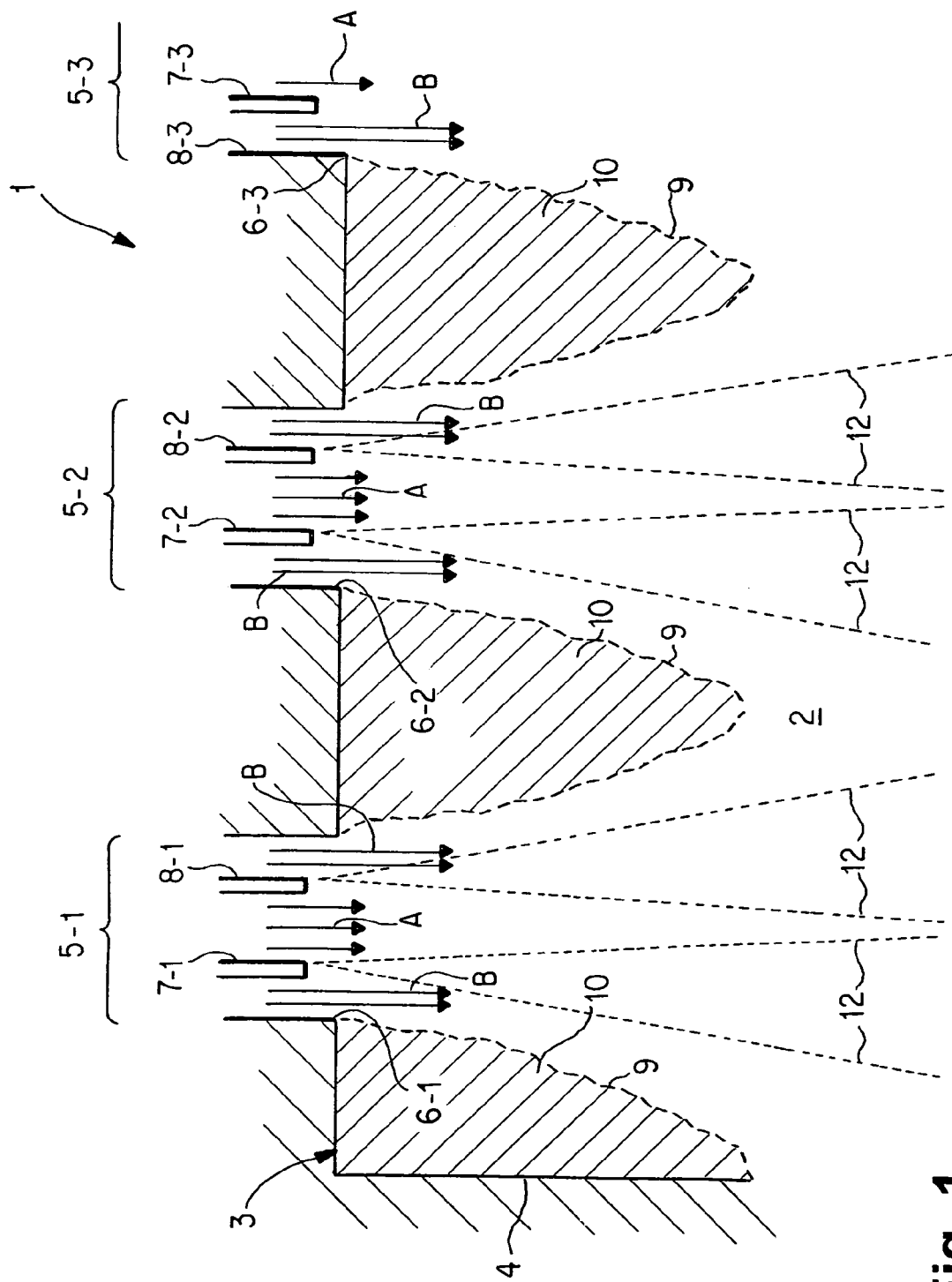
FIG. 1 is a schematic cross-sectional view of a portion of an injection head according to the invention.

According to the invention, to avoid or reduce the recirculation zones 11, the head plate 3 of an injection head 1 has a contoured design in the form of elevations 10, as shown in FIG. 1. The elevations 10 have a bulged or curved further development, with a respective foot of an elevation 10 adjoining an adjacent outlet 6-1, 6-2, 6-3. This results in a contour 9 which in the embodiment is constructed similar to the course of the boundary areas 13 from FIG. 2. As a result of the contour 9, the propellant constituents exiting from the coaxial injection elements 5-1, 5-2, 5-3 experience no sudden cross-sectional widening. Rather, as a result of the bulged contour of the elevations 10, the cross-section of the outlets 6-1, 6-2, 6-3 is widened in a targeted manner, so that, as a result of mixing, the combustion chamber 2, has at least almost exclusively, areas of good propellant constituents.

As can be seen from a comparison of FIGS. 1 and 2, the contour 9 of the injection head 1 according to the invention in FIG. 1 corresponds approximately to the course of the boundary areas 13 of the known injection head from FIG. 2. The design of the contour generally depends on the geometry of the injection head 1 and particularly on the type, size and number of injection elements 5-1, 5-2, 5-3. Although in the present embodiment according to FIG. 1, in each case, precisely one elevation 10 is arranged between adjacent outlets 6-1, 6-2, 6-3 as well as between the combustion chamber wall 4 and the outlet 6-1 of the injection element 5-1, a larger number may also be provided between respective outlets or one outlet and the combustion chamber wall.

The contouring may be integrated directly into the head plate 3 or may be deposited in the form of an additional body on the head plate 3, as illustrated in the embodiment of FIG. 1. In principle, the material of the contour 9 may have an arbitrary construction, for example, a metallic and/or non-metallic construction, and is determined particularly by the thermal stress.

In addition to improving the quality of the propellant conversion as a result of the 3-dimensional surface of the head plate, the invention also improves the scalability of so-called subscale tests. The performance characteristic of injection elements is frequently determined in propulsion units at a reduced scale. In practice, this may result in spaces between adjacent injections elements which differ in comparison with the injection head of the original size, and therefore in different losses, making the scalability of the results more difficult. By means of the contoured surface of the head plate, these losses can be reduced and, as a result, the scalability of so-called subscale tests can also be improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An injection head for a combustion chamber of a rocket propulsion unit, said injection head defining a head plate within which a plurality of injection elements are distributed, propellant constituents being injectable by the injection elements respectively through outlets in the head plate into the combustion chamber, so that a hot gas is generated by mixing and combustion of the propellant constituents in the combustion chamber, which hot gas can be accelerated to a high velocity for generating thrust;

wherein the head plate has a base area with a contoured shape that is configured such that the formation of zones of a reduced pressure between directly adjacent outlets is prevented or reduced.

2. The injection head according to claim 1, wherein the contoured shape of the base area head comprises a plurality of elevations which extend between the injection elements in the combustion chamber, whereby clearances between said outlets are avoided.

3. The injection head according to claim 2, wherein at least one elevation is arranged between each two adjacent outlets.

4. The injection head according to claim 2, wherein a single elevation is arranged between each two adjacent outlets.

5. The injection head according to claim 2, wherein each elevation has a bulged or curved contour.

6. The injection head according to claim 2, wherein a base of each elevation adjoins at least one of the outlets.

7. The injection head according to claim 2, wherein one of the elevations is arranged between an outlet and a wall bounding the combustion chamber.

8. The injection head according to claim 1, wherein:
the injection elements are arranged in said head plate; and
the contoured shape of the base area is formed by the head plate.

9. The injection head according to claim 1, wherein:
the contoured shape of the base area is formed by a body having a desired contour; and
said body is arranged on the head plate of the injection head.

10. The injection head according to claim 9, wherein the body comprises one of a metallic and a non-metallic material.

* * * * *